United States Patent
Dalton et al.

(10) Patent No.: US 8,111,987 B2
(45) Date of Patent: Feb. 7, 2012

(54) ROGUE ONU DETECTION VIA PHOTONIC MIXING

(75) Inventors: Rodger Dalton, Wake-Forest, NC (US); Jason Teeter, Apex, NC (US); Jihad Baghdadi, Raleigh, NC (US)

(73) Assignee: Alcatel Lucent, Paris (FR)

( * ) Notice: Subject to any disclaimer, the term of this patent is extended or adjusted under 35 U.S.C. 154(b) by 495 days.

(21) Appl. No.: 12/355,866

(22) Filed: Jan. 19, 2009

(65) Prior Publication Data
US 2010/0183295 A1 Jul. 22, 2010

(51) Int. Cl.
*H04B 10/08* (2006.01)
(52) U.S. Cl. .............. 398/23; 398/22; 398/17; 398/16
(58) Field of Classification Search .............. 398/22, 398/17, 16
See application file for complete search history.

(56) References Cited

U.S. PATENT DOCUMENTS

| | | | |
|---|---|---|---|
| 6,771,904 B1* | 8/2004 | Sasaki et al. | 398/25 |
| 7,558,479 B1* | 7/2009 | Robinson | 398/28 |

* cited by examiner

*Primary Examiner* — Kinam Park
(74) *Attorney, Agent, or Firm* — RG & Associates

(57) ABSTRACT

A system, method, and computer readable medium for rogue Optical Network Unit (ONU) detection via photonic mixing, comprises a first Wavelength Division Multiplexer (WDM), a second WDM communicably coupled to the first WDM, a non-linear medium communicably coupled to the second WDM, and a photodetector communicably coupled to the non-linear medium, wherein the first WDM transmits a first upstream beam and a second upstream beam to the second WDM, wherein the first upstream beam is a normal upstream beam and wherein the second upstream beam is a rogue upstream beam, wherein the second WDM transmits the normal upstream beam and the rogue upstream beam to the non-linear medium, wherein the non-linear medium mixes the normal upstream beam and the rogue upstream beam resulting in a mixed beam, wherein the non-linear medium transmits the mixed beam to the photodetector, and wherein the photodetector analyzes the mixed beam to indicate the presence of a rogue ONU.

11 Claims, 4 Drawing Sheets

US 8,111,987 B2

ROGUE ONU DETECTION VIA PHOTONIC MIXING

BACKGROUND OF THE INVENTION

The present disclosure is generally related to Optical Network Units (ONUS), and more particularly to the detection of rogue ONUs using photonic mixing.

The present disclosure is related to rogue ONUs on a Passive Optical Network (PON). Rogue ONUs are devices on the PON that transmit upstream when they are not supposed to. These rogue ONUs are undesirable and very difficult to detect and troubleshoot.

A PON is a point-to-multipoint, fiber to the premises network architecture in which unpowered optical splitters are used to enable a single optical fiber to serve multiple premises. At the source of a PON is an Optical Line Terminal (OLT), typically residing at a service provider's central office (CO). Downstream from the OLT are a number of ONUs, typically near end users. The OLT can be viewed as the source and the ONUs as the multiple destinations. These ONUs can be connected in a star arrangement using optical splitters, which reside at a premise of a user. The upstream data on the PON going from the ONUs to the OLT is time-multiplexed between the ONUs.

As previously described, rogue ONUs are devices on the PON that erroneously transmit upstream. As such, upstream light sources may interfere with one another. Therefore, what is needed is an ability to overcome the problems and limitations of detecting these rogue ONUs.

SUMMARY OF THE INVENTION

The present disclosure provides the detection of rogue ONUs by monitoring the presence and intensity of new wavelengths of light created by the mixing of two upstream light sources due to non-linear interactions in the optical material of the PON. In an exemplary embodiment, the non-linear interaction may occur, for example, inside of an optics module.

It is known in the art that materials such as potassium phosphate crystals, germanium and phosphorus doped optical fibers, and other "photonic crystals" exhibit non-linear behavior such that new wavelengths of light are created from incident light at a different frequency. Other unrelated materials may also exhibit such behavior. Knowledge of this non-linear behavior can be combined with light measurements taken from a PON to yield information about the sources of upstream light sources.

The present disclosure describes an optimized photodetector that measures the upstream light from a non-linear medium within a Line Terminal (LT) optical module. This upstream light will be a mixture of the normal ONU laser and the possible rogue ONU laser. The resultant light can be measured to determine the presence of a rogue ONU in the PON.

The present disclosure further describes a doped optical fiber, a similar non-linear medium, or another medium which is inserted into the fiber path before the LT optical module in order to provide sufficient mixing of the normal and rogue ONU beams. As in the previous case, an optimized photodetector is used to measure the resultant beam to determine the presence of the rogue ONU in the PON.

In one embodiment of the present disclosure, a system for rogue Optical Network Unit (ONU) detection via photonic mixing, comprises a first Wavelength Division Multiplexer (WDM), a second WDM communicably coupled to the first WDM, a non-linear medium communicably coupled to the second WDM, and a photodetector communicably coupled to the non-linear medium, wherein the first WDM transmits a first upstream beam and a second upstream beam to the second WDM, wherein the first upstream beam is a normal upstream beam and wherein the second upstream beam is a rogue upstream beam, wherein the second WDM transmits the normal upstream beam and the rogue upstream beam to the non-linear medium, wherein the non-linear medium mixes the normal upstream beam and the rogue upstream beam resulting in a mixed beam, wherein the non-linear medium transmits the mixed beam to the photodetector, and wherein the photodetector analyzes the mixed beam to indicate the presence of a rogue ONU.

In another embodiment of the present disclosure, a method for rogue Optical Network Unit (ONU) detection via photonic mixing consists of transmitting a first upstream beam and a second upstream beam by a first module to a second module, transmitting the first upstream beam and the second upstream beam by the second module to a non-linear medium, mixing the first upstream beam and the second upstream beam by the non-linear medium resulting in a mixed beam, transmitting the mixed beam by the non-linear medium to a photodetector, and determining a presence of a rogue beam in the mixed beam by the photodetector.

In a further embodiment of the present disclosure, a system for rogue Optical Network Unit (ONU) detection via photonic mixing, comprises a first Wavelength Division Multiplexer (WDM), a second WDM communicably coupled to the first WDM, and a photodetector communicably coupled to the second WDM, wherein the second WDM transmits a signal to the photodetector, and wherein the signal is used to determine a presence of a rogue beam.

DETAILED DESCRIPTION OF THE INVENTION

Figure 1:
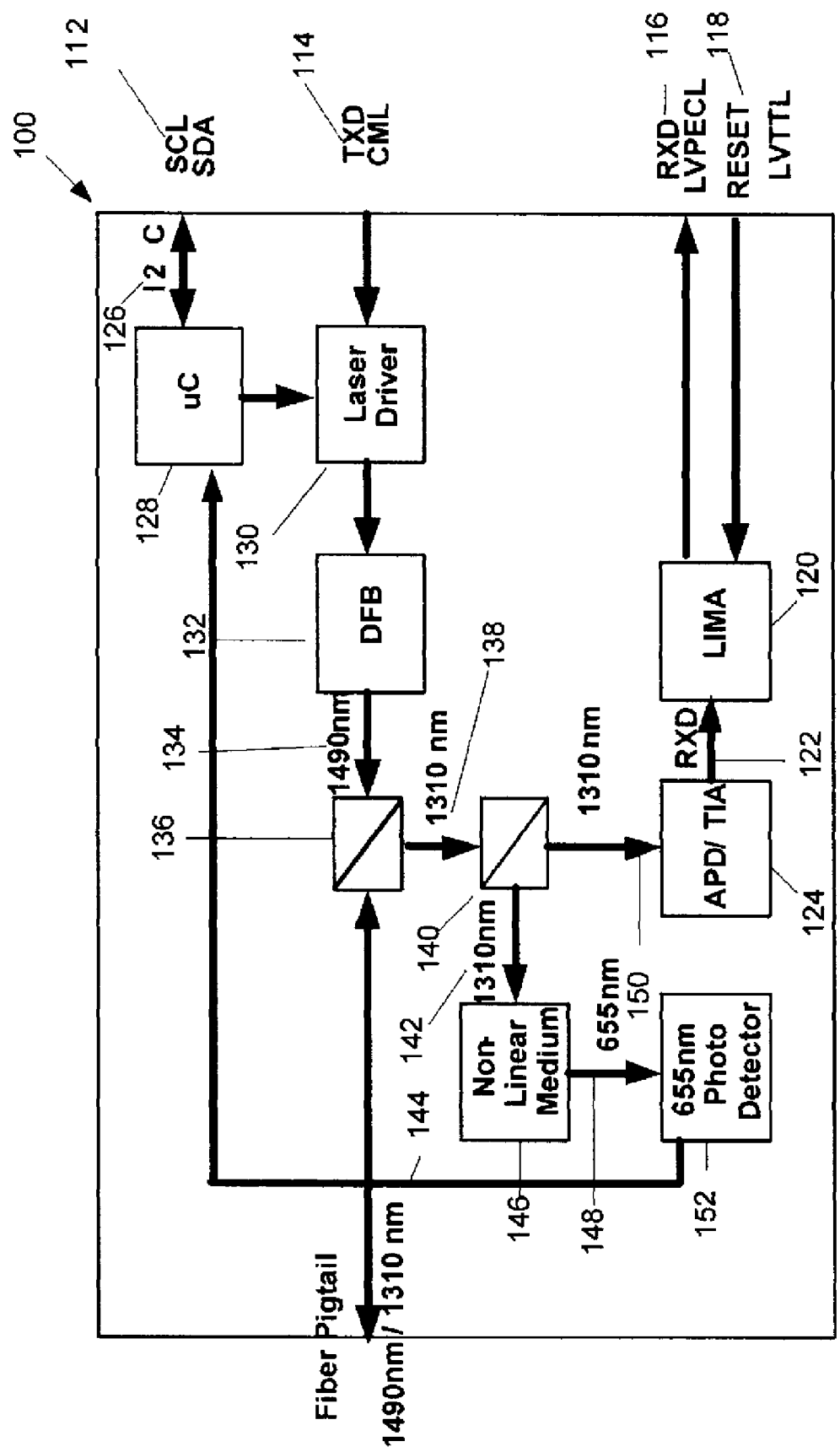
FIG. 1 depicts a first system for rogue ONU detection via photonic mixing within the LT optical module in accordance with an embodiment of the present disclosure.

Referring now to FIG. 1, a system 100 for rogue ONU detection via photonic mixing is depicted. The system 100 is an LT Optical Module comprising a number of components utilized for rogue ONU detection. Serial Clock (SCL) and Serial Data (SDA) 112 signals are transmitted via Inter-Integrated Circuit (I2C) communication 126 with a microcontroller (uC) 128. The microcontroller controls a Laser Driver 130, which itself also receives Transmitted Data (TXD) and Current Mode Logic (CML) signals 114. The laser driver drives a Distributed Feedback Laser (DFB) 132 which creates a 1490 nanometer (nm) downstream beam 134. This beam reaches the Wavelength Division Multiplexer (WDM) 136 which allows for two-way traffic on a single optical fiber, with downstream traffic at 1490 nm and upstream at 1310 nm. The WDM 136 transmits the downstream beam and receives the upstream beam from a PON (not shown) via a fiber pigtail 144. The 1310 nm upstream beam 138 continues from the WDM 136 into a second WDM 140, added for the purpose of rogue ONU detection.

One path from the splitter follows a path based on a non-detection scenario with the beam 150 passing into an Avalanche Photodiode/Trans-Impedance Amplifier (APD/TIA) 124. APDs are very sensitive photo detectors in the visible to near infrared region. The received data (RXD) 122 then passes into a Limiting Amplifier (LIMA) 120. Data leaves the LIMA 120 as, for example, Low Voltage Positive Emitter Coupled Logic signals (LVPECL) 116. The LIMA 120 also receives reset (RESET) signals 118 through Low Voltage Transistor-Transistor Logic (LVTTL).

Returning now to WDM 140, part of the 1310 nm upstream beam 142 is passed into a non-linear medium 146 which will mix the two upstream beams (one from the normal ONU and one from the rogue ONU). The result is a new frequency (and wavelength) of light that is equal to the frequency of the normal ONU laser plus the frequency of the rogue ONU laser. The mixed beam 148 is then sent to a photodetector 152 optimized for 655 nm. Note that this detector 152 can be extremely sensitive as it may be embodied as low bandwidth and seeks to measure the average power level at 655 nm. Analysis of this signal can be used to indicate the presence of a rogue ONU.

In one embodiment of the present disclosure, a system for rogue Optical Network Unit (ONU) detection via photonic mixing, comprises a first Wavelength Division Multiplexer (WDM), a second WDM communicably coupled to the first WDM, a non-linear medium communicably coupled to the second WDM, and a photodetector communicably coupled to the non-linear medium, wherein the first WDM transmits a first upstream beam and a second upstream beam to the second WDM, wherein the first upstream beam is a normal upstream beam and wherein the second upstream beam is a rogue upstream beam, wherein the second WDM transmits the normal upstream beam and the rogue upstream beam to the non-linear medium, wherein the non-linear medium mixes the normal upstream beam and the rogue upstream beam resulting in a mixed beam, wherein the non-linear medium transmits the mixed beam to the photodetector, and wherein the photodetector analyzes the mixed beam to indicate the presence of a rogue ONU.

In an exemplary embodiment of the invention, light may be split off the LT fiber and routed to a photonic crystal instead of a standard upstream receiver. If a rogue ONU is present, the rogue ONU will be transmitting 1310 nm light at a slightly different frequency and phase than the 1310 nm light coming from a normal ONU. Injecting those two frequencies/phases into a non-linear crystal will allow the two wavelengths to optically mix, and new frequencies (colors) of light will be created. Then, a detector at ~2x freq/~600-700 nm may be used to examine the light coming through the photonic crystal. If appreciable energy is seen at the shorter wavelengths, then a rogue ONU must be present. A single ONU's light may not interact with itself inside the photonic crystal and, as such, there would be no energy at the shorter wavelength under normal operation. That is, in exemplary embodiments, back reflections in the fiber may cause some interaction but not nearly as much as a rogue ONU.

The system further comprises the first WDM that transmits a downstream beam and receives the upstream beam via a fiber pigtail, wherein the photodetector is optimized for 655 nm, wherein the mixed beam is a new frequency of light, wherein the new frequency of light is equal to a frequency of a normal ONU laser plus a frequency of a rogue ONU laser, wherein the first WDM allows for two-way traffic on a single optical fiber, wherein the two-way traffic includes downstream traffic at 1490 nm and upstream traffic at 1310 nm, wherein the first WDM receives a downstream beam from a distributed feedback laser, wherein the first WDM transmits the downstream beam to a normal ONU, wherein the first WDM receives the first upstream beam from a normal ONU and receives the second upstream beam from the rogue ONU, and wherein the second WDM transmits the upstream beam to a photodiode/amplifier.

Figure 2:
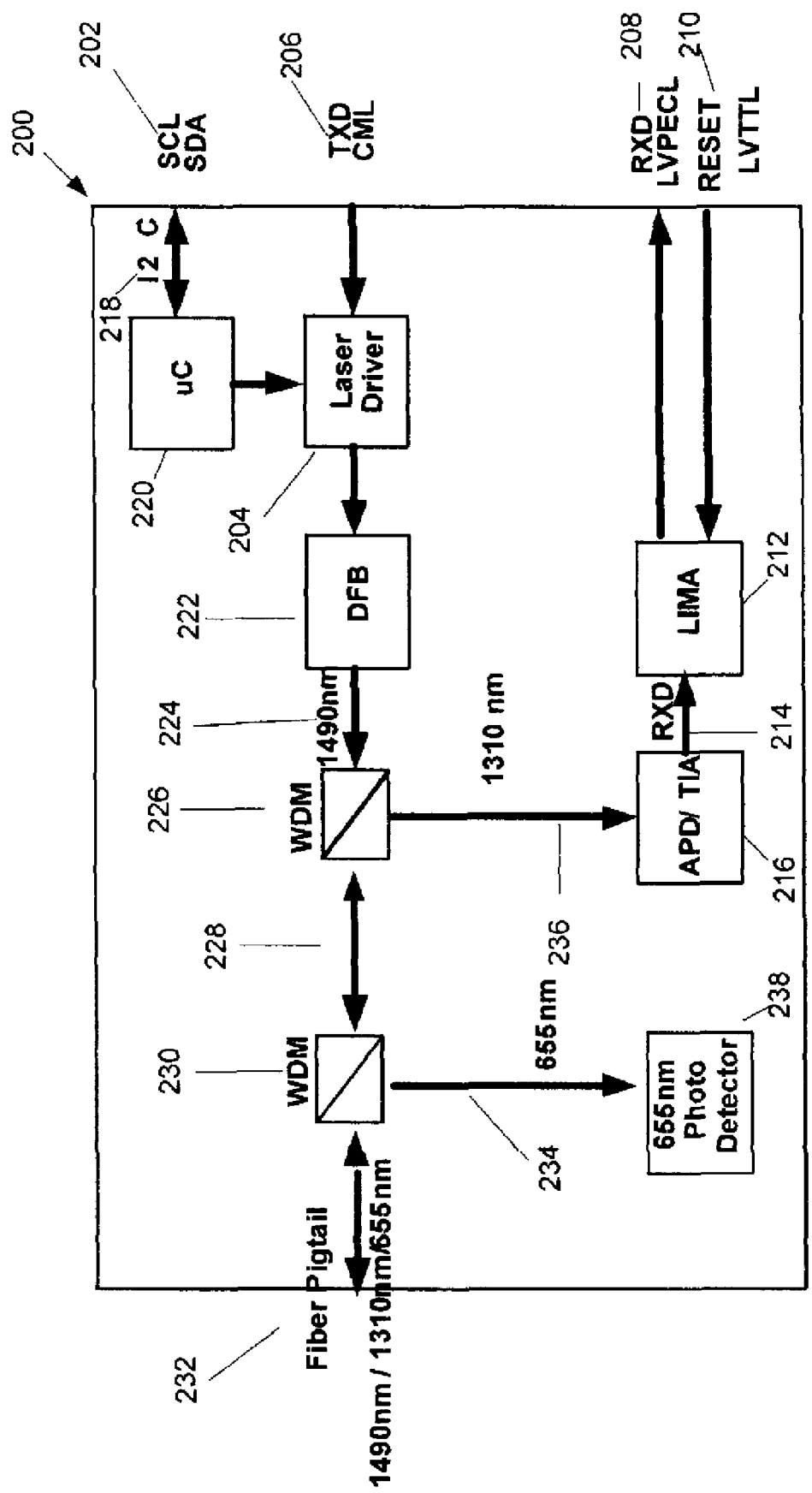
FIG. 2 depicts a second system for rogue ONU detection via photonic mixing outside the LT optical module in accordance with an embodiment of the present disclosure.

Referring now to FIG. 2, a system 200 for rogue ONU detection via photonic mixing is depicted. The system 200 is an LT Optical Module with additional components utilized for rogue ONU detection outside the LT optical module. Serial Clock (SCL) and Serial Data (SDA) 202 signals are transmitted via Inter-Integrated Circuit (I2C) communication 218 with a microcontroller (uC) 220. The microcontroller controls a Laser Driver 204, which itself also receives Transmitted Data (TXD) and Current Mode Logic (CML) signals 206. The laser driver drives a Distributed Feedback Laser (DFB) 222 which creates a 1490 nanometer (nm) downstream beam 224. This beam reaches the Wavelength Division Multiplexer (WDM) 226 which allows for two-way traffic on a single optical fiber, with downstream traffic at 1490 nm and upstream at 1310 nm. The WDM 226 transmits the downstream beam and receives the upstream beam via path 228 from a second WDM 230, added for the purposes of rogue ONU detection.

The path into the second WDM will be described later, following a description of the typical upstream data path. The 1310 nm upstream beam 236 continues from the primary WDM 226 into an Avalanche Photodiode/Trans-Impedance Amplifier (APD/TIA) 216. From here, the received data (RXD) 214 passes into a Limiting Amplifier (LIMA) 212. Data leaves the LIMA 212 as Low Voltage Positive Emitter Coupled Logic signals (LVPECL) 208. The LIMA also receives reset (RESET) signals 210 through Low Voltage Transistor-Transistor Logic (LVTTL).

Returning now to the added WDM 230 added upstream of the primary WDM, this second WDM transmits the downstream beam and receives the upstream beam from a PON (not shown) via a fiber pigtail 232. Upstream from this second WDM (outside the LT module), some length of Ge or P-doped optical fiber, a similar non-linear medium, or another type of medium is inserted into the fiber path (not depicted in the diagram). Therefore, the beams entering and exiting the LT module through the fiber pigtail 232 consist of both 1490 nm and 1310 nm signals as before, but also a 655 nm component created by the mixing of the normal and rogue ONU beams. The WDM 230 passes this latter 655 nm component 234 into a photodetector 238 optimized for 655 nm. Analysis of this signal can be used to indicate the presence of a rogue ONU.

In another embodiment of the present disclosure, a system for rogue Optical Network Unit (ONU) detection via photonic mixing, comprises a first Wavelength Division Multiplexer (WDM), a second WDM communicably coupled to the first WDM, and a photodetector communicably coupled to the second WDM, wherein the second WDM transmits a signal to the photodetector, and wherein the signal is used to determine a presence of a rogue beam.

The system further comprises the first WDM that receives a first signal and a second signal, wherein the first signal and the second signal are mixed, wherein the mixed signals produce the signal transmitted by the second WDM, and wherein the photodetector is optimized for 655 nm.

Figure 3:
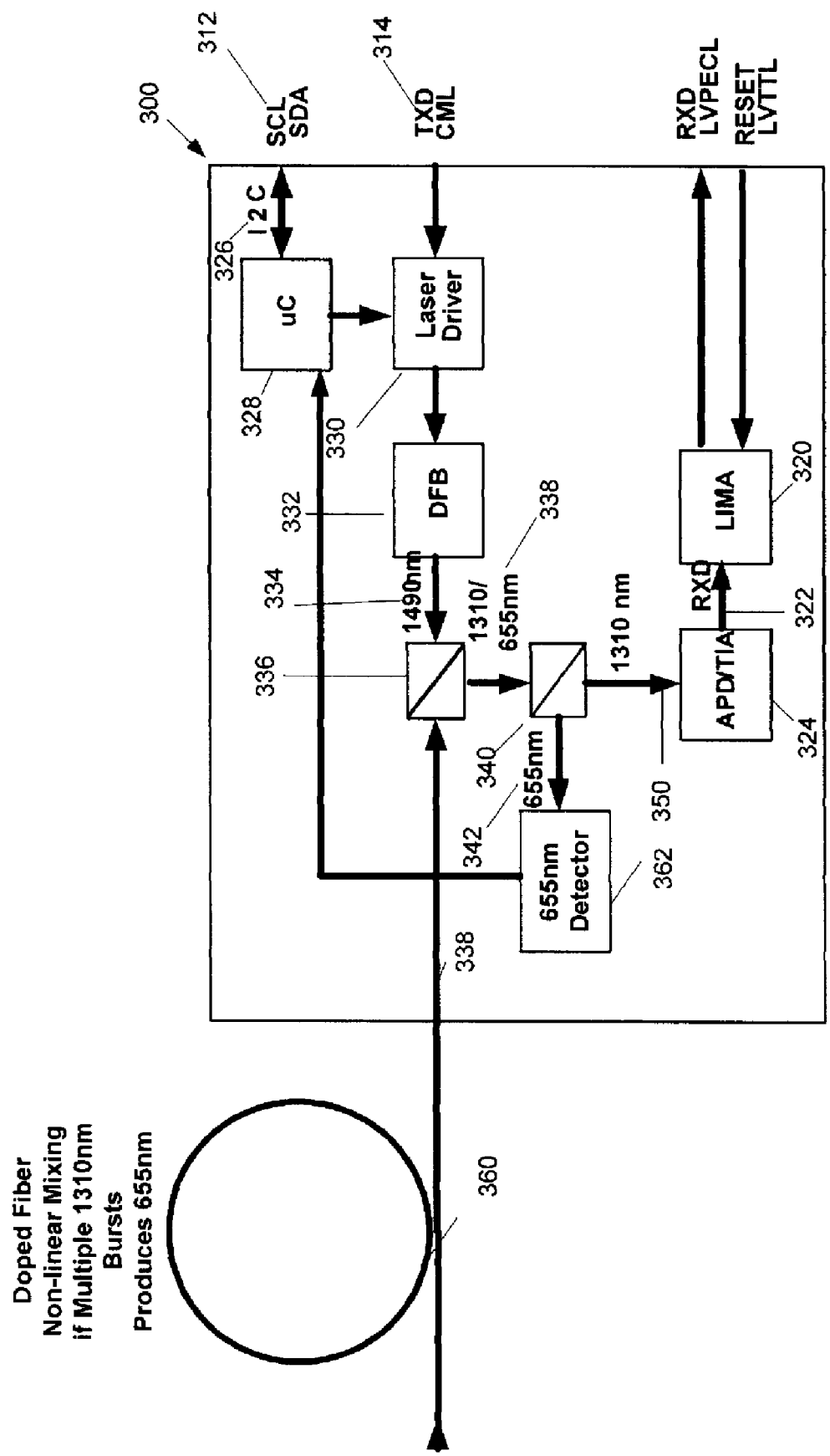
FIG. 3 depicts a third system for rogue ONU detection via a non-linear mixing with a doped fiber in accordance with an embodiment of the present invention.

Referring now to FIG. 3, a system 300 for rogue ONU detection via non-linear mixing is depicted. In FIG. 3, SCL and SDA signals 312 are transmitted via I2C communication 326 with a microcontroller (uC) 328. The microcontroller 328 controls a Laser Driver 330, which itself also receives TXD and CML signals 314. The laser driver 330 drives a DFB 332 which creates a 1490 nm downstream beam 334. This beam 334 reaches WDM 336 which may allow, in exemplary embodiments, for two-way traffic on a single optical fiber, with downstream traffic at 1490 nm and upstream traffic at 1310 nm. The WDM 336 transmits the downstream beam and receives the upstream beam via path 338 from doped fiber 360. At the doped fiber 360, non-linear mixing may occur, for example, where multiple 1310 nm bursts produce signals at 655 nm. In the exemplary embodiment, some length of Ge or P-doped optical fiber may be used for the doped fiber.

Therefore, the beams entering and exiting the LT module may consist of 1490 nm and also a 655 nm component created by the mixing of the normal and rogue ONU beams. The WDM 340 may pass this latter 655 nm component into a photodetector 362 optimized for 655 nm. Analysis of this signal can be used to indicate the presence of a rogue ONU.

Similar to the aforementioned embodiments, 1310 nm beam 350 may continue from WDM 340 into an APD/TIA 324. From here, RXD 322 passes into a LIMA 320.

With regards to the exemplary embodiments shown in FIGS. 2 and 3, photonic mixing occurring outside the module is also envisioned, and therefore, the fiber type starting after the mixing and going towards the module (e.g., towards the right side of the FIGS.) may be modified from the standard Single Mode Fiber (SMF) since, for example, some related art SMFs are designed to have cutoff wavelengths around 1200 nm, and the higher order modes in SMF degrade the transmission performance when the signal wavelength becomes shorter than the cutoff wavelength. Alternatively or in combination with fiber type modification, a mode filtering could be applied as well.

Figure 4:
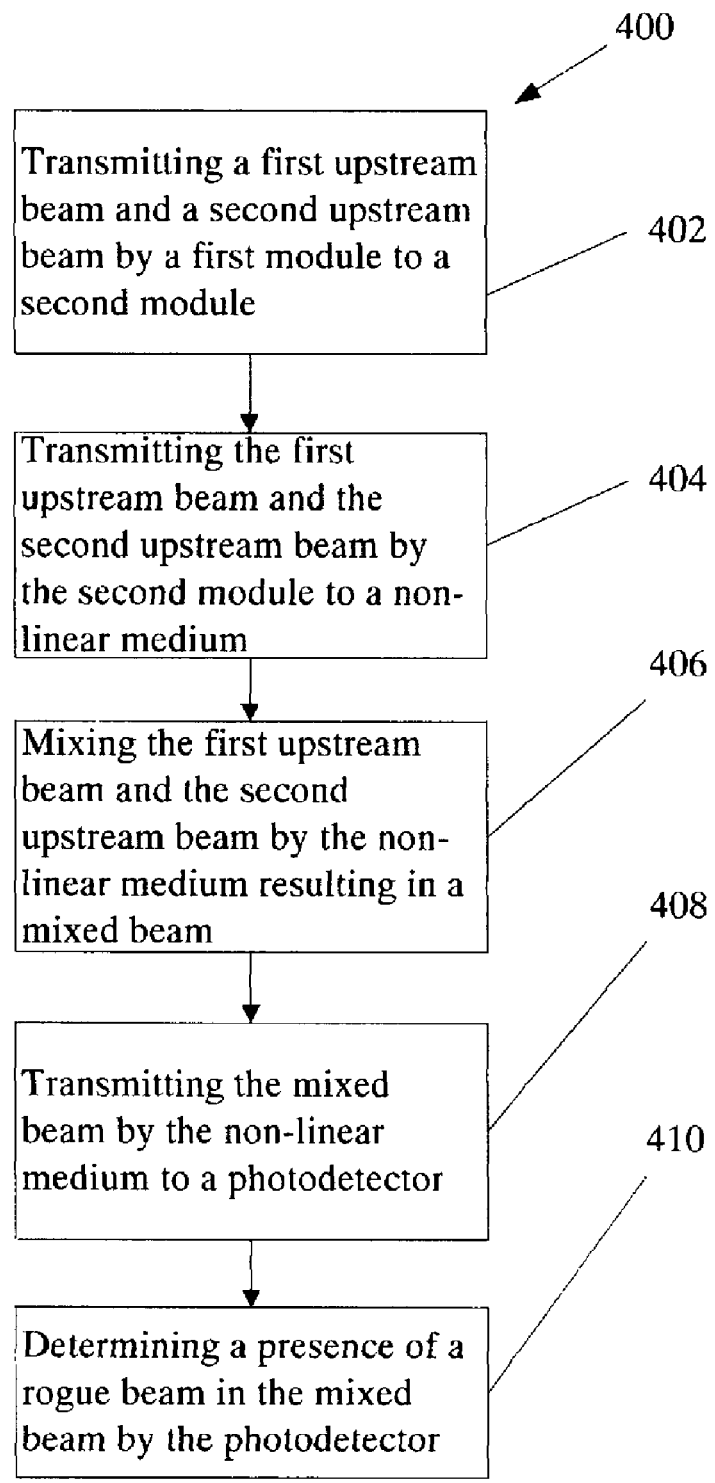
FIG. 4 depicts a method for rogue ONU detection via photonic mixing in accordance with an embodiment of the present disclosure.

FIG. 4 provides a flowchart 400 of a method for rogue Optical Network Unit (ONU) detection via photonic mixing. The method begins at step 402 with transmitting a first upstream beam and a second upstream beam by a first module to a second module. At step 404, transmitting the first upstream beam and the second upstream beam by the second module to a non-linear medium is accomplished. The method continues at step 406 with mixing the first upstream beam and the second upstream beam by the non-linear medium resulting in a mixed beam. The method further continues at step 408 with transmitting the mixed beam by the non-linear medium to a photodetector. The method is completed at step 410 with determining a presence of a rogue beam in the mixed beam by the photodetector.

Systems and methods have been shown and/or described in the above embodiments for the detection of rogue ONUs in a PON via photonic mixing. Although the above descriptions set forth preferred embodiments, it will be understood that there is no intent to limit the invention by such disclosure, but rather, it is intended to cover all modifications and alternate implementations falling within the spirit and scope of the invention. Furthermore, the embodiments are intended to cover capabilities and concepts whether they be via a loosely coupled set of components or they be converged into one or more integrated components, devices, circuits, and/or software programs.

What is claimed is:

1. A system for rogue Optical Network Unit (ONU) detection via photonic mixing, comprising:
   a first Wavelength Division Multiplexer (WDM);
   a second WDM communicably coupled to the first WDM;
   a non-linear medium communicably coupled to the second WDM; and
   a photodetector communicably coupled to the non-linear medium;
   wherein the first WDM transmits a first upstream beam and a second upstream beam to the second WDM;
   wherein the first upstream beam is a normal upstream beam and wherein the second upstream beam is a rogue upstream beam;
   wherein the second WDM transmits the normal upstream beam and the rogue upstream beam to the non-linear medium;
   wherein the non-linear medium mixes the normal upstream beam and the rogue upstream beam resulting in a mixed beam;
   wherein the non-linear medium transmits the mixed beam to the photodetector; and
   wherein the photodetector analyzes the mixed beam to indicate the presence of a rogue ONU.

2. The system of claim 1, wherein the first WDM transmits a downstream beam and receives the upstream beam via a fiber pigtail.

3. The system of claim 1, wherein the photodetector is optimized for 655 nm.

4. The system of claim 1, wherein the mixed beam is a new frequency of light.

5. The system of claim 4, wherein the new frequency of light is equal to a frequency of a normal ONU laser plus a frequency of a rogue ONU laser.

6. The system of claim 1, wherein the first WDM allows for two-way traffic on a single optical fiber.

7. The system of claim 6, wherein the two-way traffic includes downstream traffic at 1490 nm and upstream traffic at 1310 nm.

8. The system of claim 1, wherein the first WDM receives a downstream beam from a distributed feedback laser.

9. The system of claim 8, wherein the first WDM transmits the downstream beam to a normal ONU.

10. The system of claim 1, wherein the first WDM receives the first upstream beam from a normal ONU and receives the second upstream beam from the rogue ONU.

11. The system of claim 1, wherein the second WDM transmits the upstream beam to a photodiode/amplifier.

* * * * *